Jan. 20, 1942.  J. H. DUNN  2,270,278
METHOD OF JOINING
Filed July 20, 1939

INVENTOR.
JOHN HOWARD DUNN.
BY
ATTORNEY.

Patented Jan. 20, 1942

2,270,278

UNITED STATES PATENT OFFICE 2,270,278

METHOD OF JOINING

John H. Dunn, Springdale, Pa., assignor to Aluminum Company of America, Pittsburgh, Pa., a corporation of Pennsylvania Application July 20, 1939, Serial No. 285,565

3 Claims. (Cl. 219—10)

This invention relates to an improved method of forming a composite metallic structure particularly adaptable for use as paneling in the field of transportation.

The object of the invention is to provide a method of forming a composite structure from a plurality of metal members of different electrical resistances or compositions, wherein spot welding may be employed to a certain extent, thereby reducing the cost of fabrication.

Aluminum and its alloys enjoy wide usage in the construction of railway cars and buses, particularly as panels both inside and out. Aluminum panels, whether they be single walled formed from a single sheet of metal or dual walled having inner and outer walls with stiffening and strengthening members therebetween, have generally been welded to upright members such as side posts, which have likewise been aluminum or aluminum alloy. In this type of construction, no difficulty has been experienced in welding the panel sheets to the side posts, because both panels and posts were of similar composition and resistance. On the other hand, considerable difficulty is encountered when welding is attempted in fabricating a composite structure from a plurality of metallic members having dissimilar compositions or resistances. For instance, it has generally been necessary to resort to riveting when joining an aluminum panel sheet to a steel side post. This procedure is not only more costly than welding, but quite often the panels do not present a pleasing appearance due to the protuberance of the rivets. My method admirably lends itself to the formation of a panel of this type in which riveting is unnecessary.

For a better understanding of the invention, reference may now be had to the accompanying drawing forming a part of this specification, of which:

Figure 2:
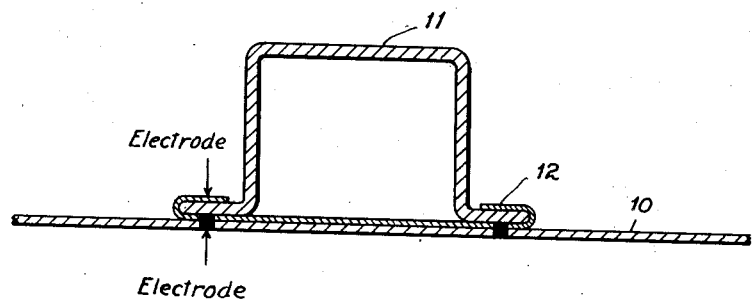
Fig. 2 is a view taken on the line II—II of Fig. 1.
Figure 1:
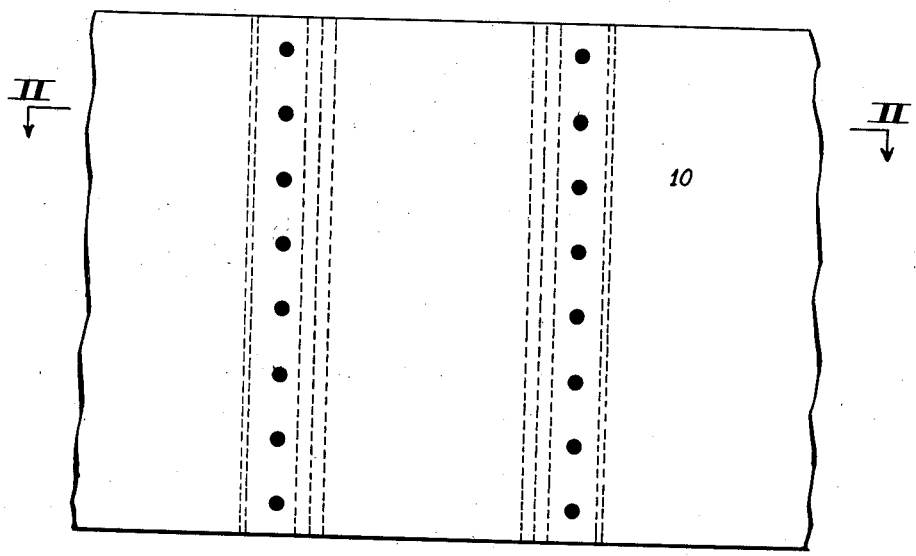
Fig. 1 is a plan view of the panel assembly.

Referring to the drawing, reference character 10 designates an aluminum or aluminum alloy sheet which is to be assembled with the steel side post 11. A liner or intermediate member 12, having a composition and resistance similar to that of member 10, is positioned so that it will be between the aluminum panel and the steel side post. This is preferably accomplished by first assembling the liner with the side post member by bending the ends of the liner around the feet of the side post, as best shown in Fig. 2. It is desirable that a good tight friction fit be made between these two members. This assembly is then placed on the sheet 10 and is ready to be spot welded.

It is generally recognized that the resistance of steel to the passage therethrough of an electrical current is greater than that of aluminum. In other words, aluminum possesses greater electrical and heat conductivity than does steel. Because of this characteristic, it will be appreciated that, if the welding electrodes were put across the steel and the aluminum, the steel would resist the passage of the welding current and generate enough heat around the electrode to burn the steel. According to my invention, the electrodes are placed across the aluminum sheet 10 and the aluminum binder 12, as shown in Fig. 2. When the electrodes are pressed into welding position, the current will pass around the aluminum binder instead of through the steel, and welding will result between the two aluminum members without injury to the steel side post member. Any current which might pass through the steel will not be enough to heat the steel to effect a weld between the steel and the aluminum binder 12.

While I have disclosed in this application a particular embodiment of my invention, I realize that the same may be varied, and therefore I claim my invention broadly as indicated in the following claims:

1. The method of forming a metallic structure incorporating a ferrous and a non-ferrous member, the non-ferrous member being characterized by having a lower electrical resistance than the ferrous member, the steps comprising positioning a metal liner having a resistance substantially equal to that of the non-ferrous member between the non-ferrous and ferrous member, mechanically securing the metal liner to the ferrous member by bending portions of the former over a portion of said ferrous member, and passing a welding current through and around the bent over portions of said metal liner and through said non-ferrous member, thereby forming a weld between the metal liner and non-ferrous member.

2. The method of forming a metallic structure incorporating a ferrous and a non-ferrous member, the non-ferrous member being characterized by having a lower electrical resistance than the ferrous member, the steps comprising positioning a metal liner having a resistance substantially equal to that of the non-ferrous member, frictionally securing the metal liner to the ferrous member by bending portions of the former over a portion of said ferrous member, and passing a welding current through and around the bent over portions of said metal liner and through said non-ferrous member, thereby forming a weld between the metal liner and non-ferrous member.

3. The method of forming a structure having an aluminum panel and a steel backing member which comprises positioning a liner between said panel and said backing member, frictionally securing said liner to said steel member by bending portions of the former over at least a portion of said steel member, and passing welding current through and around said bent-over portions and through said aluminum panel to weld the same.

JOHN H. DUNN.